(12) United States Patent
Füchtling et al.

(10) Patent No.: US 10,412,887 B2
(45) Date of Patent: Sep. 17, 2019

(54) COMBINE HARVESTER INCLUDING BELT CUTTING UNIT AND CONTROL UNIT

(71) Applicant: CLAAS Selbstfahrende Erntemaschinen GmbH, Harsewinkel (DE)

(72) Inventors: Christian Füchtling, Drensteinfurt (DE); Mathieu Köhler, Gütersloh (DE); Thomas Hinz, Harsewinkel (DE); Burkhard Sagemüller, Gütersloh (DE); Udo Beschorn, Harsewinkel (DE); Andreas Wielenberg, Herford (DE); Balazs Tillman, Szolnok (HU); Berthold Hamphoff, Beelen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 90 days.

(21) Appl. No.: 15/678,445

(22) Filed: Aug. 16, 2017

(65) Prior Publication Data

US 2018/0054964 A1    Mar. 1, 2018

(30) Foreign Application Priority Data

Aug. 23, 2016   (DE) .................. 10 2016 115 589

(51) Int. Cl.
*A01D 41/127*   (2006.01)
*A01D 41/14*    (2006.01)
(Continued)

(52) U.S. Cl.
CPC ......... *A01D 41/127* (2013.01); *A01D 41/141* (2013.01); *A01D 57/20* (2013.01);
(Continued)

(58) Field of Classification Search
CPC .... A01D 57/20; A01D 41/142; A01D 75/287; A01D 34/008; A01D 41/127;
(Continued)

(56) References Cited

U.S. PATENT DOCUMENTS 5,921,070 A * 7/1999 Chamberlain ....... A01D 45/021
56/10.2 G
5,927,054 A * 7/1999 Chamberlain ....... A01D 45/021
56/10.2 E
(Continued)

FOREIGN PATENT DOCUMENTS

EP    2 382 854 A1    11/2011

OTHER PUBLICATIONS

European Search Report for European Patent Appln. No. EP17160515 dated Oct. 24, 2017, 5 pages.

*Primary Examiner* — Arpad Fabian-Kovacs
(74) *Attorney, Agent, or Firm* — Lempia Summerfield Katz LLC

(57) ABSTRACT

A combine harvester includes a belt cutting unit comprising a center belt for conveying harvest to an intake roller and/or to an intake channel of a grain conveyor, and a transverse conveyor belt disposed each on the left-hand side and the right-hand side of the center belt, to convey harvest to the center belt. The center belt, left-hand and right-hand transverse conveyor belts are behind a cutter bar, seen in the direction of travel, with each being operated with an individual belt speed. The combine harvester and/or belt cutting unit has a control unit configured to automatically control the belt speeds of the left-hand and right-hand transverse conveyor belts as a function of a forward travel speed, and the belt speeds of the center belt as a function of the forward travel speed or as a function of the belt speeds of the left-hand and right-hand transverse conveyor belts.

23 Claims, 4 Drawing Sheets

(51) Int. Cl.
*A01D 61/00* (2006.01)
*A01D 61/02* (2006.01)
*B65G 43/00* (2006.01)
*A01D 57/20* (2006.01)
*A01D 75/28* (2006.01)
*A01D 41/02* (2006.01)

(52) U.S. Cl.
CPC ......... *A01D 61/002* (2013.01); *A01D 61/008* (2013.01); *A01D 61/02* (2013.01); *A01D 75/287* (2013.01); *B65G 43/00* (2013.01); *A01D 41/02* (2013.01); *B65G 2203/0291* (2013.01)

(58) Field of Classification Search
CPC .. A01D 47/141; A01D 61/002; A01D 61/008; A01D 61/02; A01D 41/02; A01B 79/005; B65G 43/00; B65G 2203/0291
See application file for complete search history.

(56) References Cited

U.S. PATENT DOCUMENTS

| | | |
|---|---|---|
| 8,087,224 B1 | 1/2012 | Coers et al. |
| 8,833,044 B2* | 9/2014 | Hoffman ................ A01D 57/20 56/10.6 |
| 9,265,199 B2* | 2/2016 | Ritter ................... A01D 75/287 |
| 9,668,406 B2* | 6/2017 | Dybro ................. A01D 34/008 |
| 2007/0012014 A1* | 1/2007 | Strosser ................ A01D 57/20 56/10.2 R |
| 2010/0223896 A1* | 9/2010 | Eick ..................... A01D 61/002 56/10.2 A |
| 2011/0270494 A1* | 11/2011 | Imhof ................... A01D 57/20 701/50 |
| 2015/0135675 A1 | 5/2015 | Ritter et al. |
| 2018/0199508 A1* | 7/2018 | Mueller ............... A01D 41/141 |

* cited by examiner

COMBINE HARVESTER INCLUDING BELT CUTTING UNIT AND CONTROL UNIT

CROSS REFERENCE TO RELATED APPLICATION

This application claims priority to German Patent Application No. DE 102016115589.6, filed Aug. 23, 2016, the entire disclosure of which is hereby incorporated herein by reference.

TECHNICAL FIELD

This application relates generally to agricultural work machines, and specifically to a belt cutting unit in a combine harvester.

BACKGROUND

Attachments for harvesters have a conveyor device behind the cutter bars in order to feed the cut harvest over the entire width of the attachment to an intake channel of a grain conveyor. Frequently, the conveyor device is disposed in the middle. For example, intake augers may be used as conveyors, i.e., rollers having opposed auger flights, and/or conveyor belts. Attachments, which substantially use conveyor belts to convey the harvest to the intake channel, are referred to as belt cutting units. The conveyor belts of the belt cutting units convey the harvest in a gentler and more consistent manner to the intake channel than intake augers, in particular with smaller quantities of harvest. Belt cutting units are also typically lighter, which may allow for having very wide cutting units. Moreover, belt cutting units may make higher harvest outputs possible.

Thus, using a center belt for conveying the harvest to the intake channel, which is loaded with harvest by adjacent transverse conveyor belts, may assist the harvester. Further, the belt speed of the conveyor belts may be adjusted to improve the harvest output.

US 2015/0135675 A1 discloses a control of the conveyor belt speed as a function of the slope. The belt speeds of the center belt and the transverse conveyor belts can be adjusted individually as a function of the slope.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Figure 1:
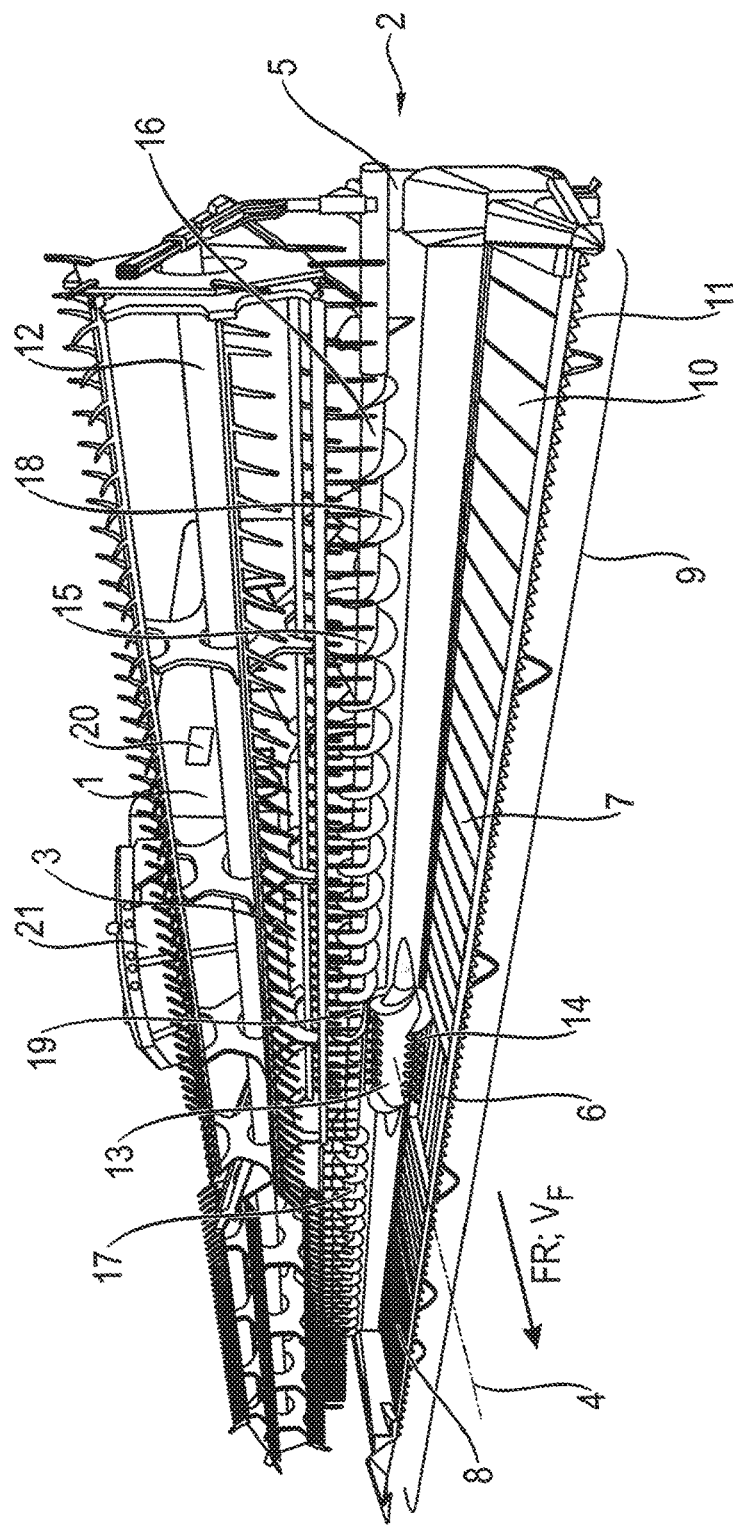
FIG. 1 shows a perspective view of a combine harvester having a belt cutting unit.

As discussed above, belt speeds of the center belt and the transverse conveyor belts can be adjusted individually as a function of the slope. However, belt speed control that is only active on a slope may be overly limiting.

It has been shown that the depicted belt cutting unit and the control of the belt speed of the conveyor belts disclosed therein are not sufficient for an optimal harvest output.

As discussed in more detail below, a self-driving combine harvester is disclosed that has a belt cutting unit and an alternative control of the belt speed of the conveyor belts, which may improve the harvest output.

In one implementation, a combine harvester having a belt cutting unit is disclosed. The belt cutting unit may comprise at least a center belt for conveying harvest to an intake roller and/or to an intake channel of a grain conveyor, and at least one transverse conveyor belt disposed on both the left side and the right side of the center belt for conveying the harvest to the center belt, and the center belt, the left-hand and the right-hand transverse conveyor belts are disposed behind a cutter bar, seen in the direction of travel, and the center belt, the left-hand and the right-hand transverse conveyor belts can each be operated at an individual respective belt speed. The combine harvester and/or the belt cutting unit may include a control unit, with the control unit configured to automatically control the belt speeds of the left-hand and the right-hand transverse conveyor belts, depending in each case on a forward travel speed, and to automatically control the belt speed of the center belt, depending on the forward travel speed or depending on the belt speeds of the left-hand and the right-hand transverse conveyor belts. In this regard, the output performance of the combine harvester may be improved in that the conveyance performance can be individually adapted to specific conditions. The forward travel speed may be directly proportional to the quantity of harvest that is to be accommodated by the belt cutting unit per unit of time. The belt speeds may thus be automatically adjusted to the harvest quantities per time unit through the automatic control of the belt speeds as a function of the forward travel speed, by means of which the harvest output may be optimized and homogenized. Moreover, the danger of overloading the center belt and/or the transverse conveyor belts with too much harvest may be reduced. Furthermore, the belt speeds of the center belt may be set differently to the belt speeds of the transverse conveyor belts. Thus, the belt speed of the center belt can be adjusted in a simple manner to the additional loading with harvest by the transverse conveyor belts.

In one implementation, the belt speeds of the left-hand and the right-hand transverse conveyor belts and/or the belt speed of the center belt may be coupled to the forward travel speed. As a result, the control unit may control the belt speeds as a function of the harvest quantity in a simpler manner.

In another implementation, it is conversely provided that the belt speed of the center belt is coupled to the belt speeds of at least the left-hand and/or the right-hand transverse conveyor belts. As a result, the belt speed of the center belt may be adjusted in a simple manner to the belt speed of the transverse conveyor belts. Thus, the belt speed of the center belt can be adjusted to the harvest flow from the transverse conveyor belts. In a specific implementation, an optimal relationship of the belt speeds to one another can be set. Furthermore, the optimal relationship of the belt speeds to one another can be maintained when the forward travel speed changes.

Alternatively or in addition, the belt speed of the center belt, the belt speed of the left-hand transverse conveyor belt, and/or the belt speed of the right-hand transverse conveyor belt may be coupled to the forward travel speed in a manner specific to the type of harvest, and more particularly, such that with grains, higher belt speeds may be set, and with rapeseed, lower belt speeds may be set. This may have the effect, among other things, that with a harvest having a lower density, such as rapeseed, slippage between the harvest and the center belt and the transverse conveyor belts is prevented or reduced, and the harvest is transported reliably by the center belt and the transverse conveyor belts.

In one design, a minimum belt speed and a maximum belt speed may be set for any one, any combination, or all of: the center belt; the left-hand and the right-hand transverse conveyor belts. As a result of the minimum belt speed, a stopping of the center belt and the transverse conveyor belts may be prevented at slower forward travel speeds. Further, as a result of the maximum belt speed, the slippage between the harvest and the center belt and the transverse conveyor belts may be prevented from becoming too great. Thus, the harvest is reliably gathered and transported by the center belt.

In order that the higher harvest quantities on the center belt due to the additional harvest from the transverse conveyor belts does not result in a backup of harvest in front of the intake channel, and as a result, in a blockage of the intake channel and/or a jamming of the chain conveyor of the grain conveyor, the center belt may have a higher belt speed than the left-hand and right-hand transverse conveyor belts.

In another design, with slopes, the belt speeds of the left-hand and/or the right-hand transverse conveyor belts may be controlled as a function of the tilt of the belt cutting unit and the conveyance directions of the left-hand and the right-hand transverse conveyor belts. In one particular instance, the belt speed of the transverse conveyor belt conveying uphill is increased, and/or the belt speed of the downhill conveying transverse conveyor belt is reduced. As a result, a downhill movement of the harvest is compensated for, and the harvest is conveyed consistently on a slope.

In one implementation, in order to enable a downward rolling of the harvest from the center belt and a quick removal of the harvest from the center belt, the belt speed of the center belt may be regulated depending on the tilt of the belt cutting unit.

In that the belt speeds of the center belt, the left-hand and the right-hand belts may be reduced to the minimum belt speed when driving out of the crop, the wear to the center belt and the transverse conveyor belts may be reduced. Furthermore, this may result in a reduction in energy consumption.

In another implementation, the belt speeds of the left-hand and the right-hand transverse conveyor belts and the belt speed of the center belt may be manually set in a range between the minimum belt speed and the maximum belt speed. As a result, the vehicle operator can set necessary belt speeds manually, if this is recommended because of the state of the harvest, e.g., harvest moistness, or the crop density, among other things. The vehicle operator can preferably switch between an automatic mode, in which the control unit is in control, and the manual mode.

In one design, the conveyance directions of the center belt, the left-hand and the right-hand transverse conveyor belts can be reversed, a jamming of the conveyor belts can be rectified without the vehicle operator having to leave the driver's cab. In this regard, the control unit may be configured to order the reversing of the conveyance directions of one, some or all of the center belt, the left-hand transverse conveyor belt and the right-hand transverse conveyor belt. Jamming of the conveyor belts can take place in particular when rocks are clamped between the transverse conveyor belts and the center belt. Likewise, a winding of straw on the center belt or the transverse conveyor belts can lead to jamming. In one implementation, a deceleration and an acceleration of the center belt and the transverse conveyor belts is slight. This gentle approach has the advantage that actuators, e.g., hydraulic motors, and other components of the belt cutting unit are protected by a lower torque.

In another design, the grain conveyor has a chain conveyor, and a direction of rotation for the intake roller and/or a direction of conveyance for the chain conveyor of the grain conveyor and the direction of conveyance of the center belt can be reversed collectively, and the left-hand and the right-hand transverse conveyor belts can be stopped. In this regard, the control unit may be configured to: order the reversing of the direction of rotation for the intake roller and/or a direction of conveyance for the chain conveyor of the grain conveyor and the direction of conveyance of the center belt; and/or order the stopping of the left-hand transverse conveyor belt and the right-hand transverse conveyor belt. As a result, if the chain conveyor of the grain conveyor is jammed or overloaded with too much harvest, or if the intake channel is blocked by a back-up of harvest, an intake of the harvest can be reversed. The harvest conveyed out of the grain conveyor in the direction of travel is returned from the intake roller to the center belt, which conveys the harvest in the direction of travel FR and in front of the belt cutting unit. As a result, and through the stopping of the transverse conveyor belts, a back-up of harvest on the center belt or in front of the intake rollers is avoided, preventing a repeated jamming when the harvesting is resumed. The decelerating and accelerating of the center belt is preferably slow. This gentle approach may result in the slippage between the harvest and the center belt being kept low. As a result, the harvest is collected more efficiently, and transported more quickly in the reversed conveyance direction.

In still another design, the combine harvester has a multi-function lever in a driver's cab with a switch, wherein the switch reverses the center belt, the left-hand and the right-hand transverse conveyor belt in a first switch setting, and reduces the belt speeds of the center belt, the left-hand and the right-hand transverse conveyor belts to a predefined value, for example to 25% of the belt speeds that have been set, in a second switch setting. In this regard, the control unit may receive the first switch setting, and responsive to receiving the first switch setting, reverse one, some or all of: the center belt; the left-hand transverse conveyor belt; and the right-hand transverse conveyor belt. Further, the control unit may receive the second switch setting, and responsive to receiving the second switch setting, reduce one, some or all of the following to the predetermined value: the center belt; the left-hand transverse conveyor belt; and the right-hand transverse conveyor belt. This design has the advantage that the driver has direct and quick access to the most important functions. The reversing, i.e. the inverting, of the conveyance directions serves to release jamming of the center belt and/or the transverse conveyor belts. As a result of the temporary reduction of the belt speeds such as to 25% of the belt speeds set by the control unit or the vehicle operator, the driver can react to local lower crop densities, in order to homogenize a harvest flow.

In that the belt cutting unit preferably has an intake roller for drawing the harvest into the intake channel behind the center belt, and/or at least one header auger for conveying harvest to the intake roller and/or to the center belt, and the control unit is configured to control a rotational rate of the intake roller and/or a rotational rate of the header auger as a function of the forward travel speed, the harvest may be transferred with less disruption to the grain conveyor of the combine harvester. The rotational rates can be automatically adjusted to the harvest quantities in a simple manner, by means of which the harvest output is increased and/or homogenized. The header auger is advantageous, in particular with voluminous harvests, e.g. rapeseed.

Turning now to the figures, FIG. 1 shows a schematic perspective view of a combine harvester 1 having a belt cutting unit 2.

The belt cutting unit 2 is disposed on the front of the combine harvester 1 at a grain conveyor 3 of the combine harvester 1. In one implementation, the belt cutting unit 2 may be mounted at the grain conveyor 3. The belt cutting unit 2 has a longitudinal axis 4, which extends through the middle, and parallel to a direction of travel FR. Furthermore, the belt cutting unit 2 has a frame 5. The belt cutting unit 2 has a center belt 6 disposed in the middle, and transverse conveyor belts, including left-hand transverse conveyor belt 7 and right-hand transverse conveyor belt 8, disposed respectively in each case on the left-hand and a right-hand sides of the center belt 6, adjacently thereto. Alternatively, instead of one center belt 6, numerous center belts 6 are disposed in the belt cutting unit, and/or instead of one left-hand transverse conveyor belt 7 and one right-hand transverse conveyor belt 8, a plurality (e.g., 2 or more) of left-hand transverse conveyor belts 7 and a plurality (e.g., 2 or more) of right-hand transverse conveyor belts 8 are disposed in the belt cutting unit 2. The center belt 6 and the transverse conveyor belts 7, 8 are disposed such that collectively, they extend substantially over the entire width 9 of the belt cutting unit 2. The center belt 6 and the transverse conveyor belts 7, 8 each comprise a continuous belt 10.

A continuous, preferably flexible cutter bar 11 is disposed in front of the center belt 6 and the transverse conveyor belts 7, 8, counter to the direction of travel FR. Furthermore, a pivotable reel 12 is disposed on the frame 5 of the belt cutting unit 2. The cutter bar 11 and the reel 12 extend thereby substantially over the width 9 of the belt cutting unit 2. In the aft region of the center belt 6, an intake roller 13 having finger elements 14 is disposed above the center belt 6, and extending substantially over the width of the center belt 6. Alternatively, the intake roller 13 can also be designed as an intake auger, for example, having auger flights. An intake channel 19 of the grain conveyor 3 of the combine harvester 1 is disposed behind the intake roller 13. Furthermore, a header auger 15 extends above the center belt 6, the transverse conveyor belts 7, 8 and the intake roller 13, and substantially over the width 9 of the belt cutting unit 2, transverse to the direction of travel FR. The header auger 15 has two rollers (first roller of the head auger 16, second roller of the head auger 17), having opposing auger flights 18.

The combine harvester 1 also has a control unit 20, indicated schematically in FIG. 1, and explained further in greater detail below, for controlling the belt cutting unit 2, among other things. The control unit 20 controls the cutter bar 11, the intake roller 13, the header auger 15, and in particular the center belt 6 and the transverse conveyor belts 7, 8 of the belt cutting unit 2. The control unit 20 may be integrated into one or more devices. For example the control unit 20 may be integrated in a central regulating and control unit in the combine harvester 1. Likewise, in an alternative design, the control unit 20 can be assigned to the belt cutting unit 2, or the control thereof can be divided between numerous control units 20. The combine harvester 1 has a driver's cab 21 on the front.

In one implementation, the control unit 20 may be hardware or a combination of hardware and software. In a first specific implementation, the control unit 20 may comprise a single computing unit. In a second specific implementation, the control unit 20 may be divided or segmented into multiple sub-control units (as discussed above), which may be configured to execute specific functions, as discussed in further detail herein. As one example, the control unit (or a subpart thereof) may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, the control unit 20 (or a subpart thereof) may include memory hardware that comprises instructions executable with a processor or processor circuitry to implement one or more of the features of the module.

The combine harvester 1 having the belt cutting unit 2 exhibits forward travel in the harvesting mode in the direction of travel FR having a forward travel speed $v_F$. The reel 12 feeds the harvest to the cutter bar 11, which separates the harvest. The separated harvest is fed to the center belt 6 and the transverse conveyor belts 7, 8 through the forward travel of the combine harvester 1 and by means of the reel 12. The transverse conveyor belts 7, 8 convey the harvest, transverse to the longitudinal axis 4 of the belt cuttings system 2, to the center belt 6. The conveyance to the center belt 6, transverse to the longitudinal axis 4, is supported by means of the header auger 15. Furthermore, the header auger 15 condenses voluminous harvest. Alternatively, a belt cutting unit 2 without a header auger 15 is also envisioned, in particular for use with compact harvests, or smaller harvest quantities. The center belt 6 is disposed beneath the transverse conveyor belts 7, 8 such that harvest falls onto the center belt 6 when conveyed by the transverse conveyor belts 7, 8. The center belt 6 conveys the harvest to the intake roller 13. This receives the harvest, condenses it, and transports it into the intake channel 19 of the grain conveyor 3. The harvest is then conveyed by the grain conveyor 3 to the threshing unit (not shown) of the combine harvester 1, where it is further processed.

Figure 2A:
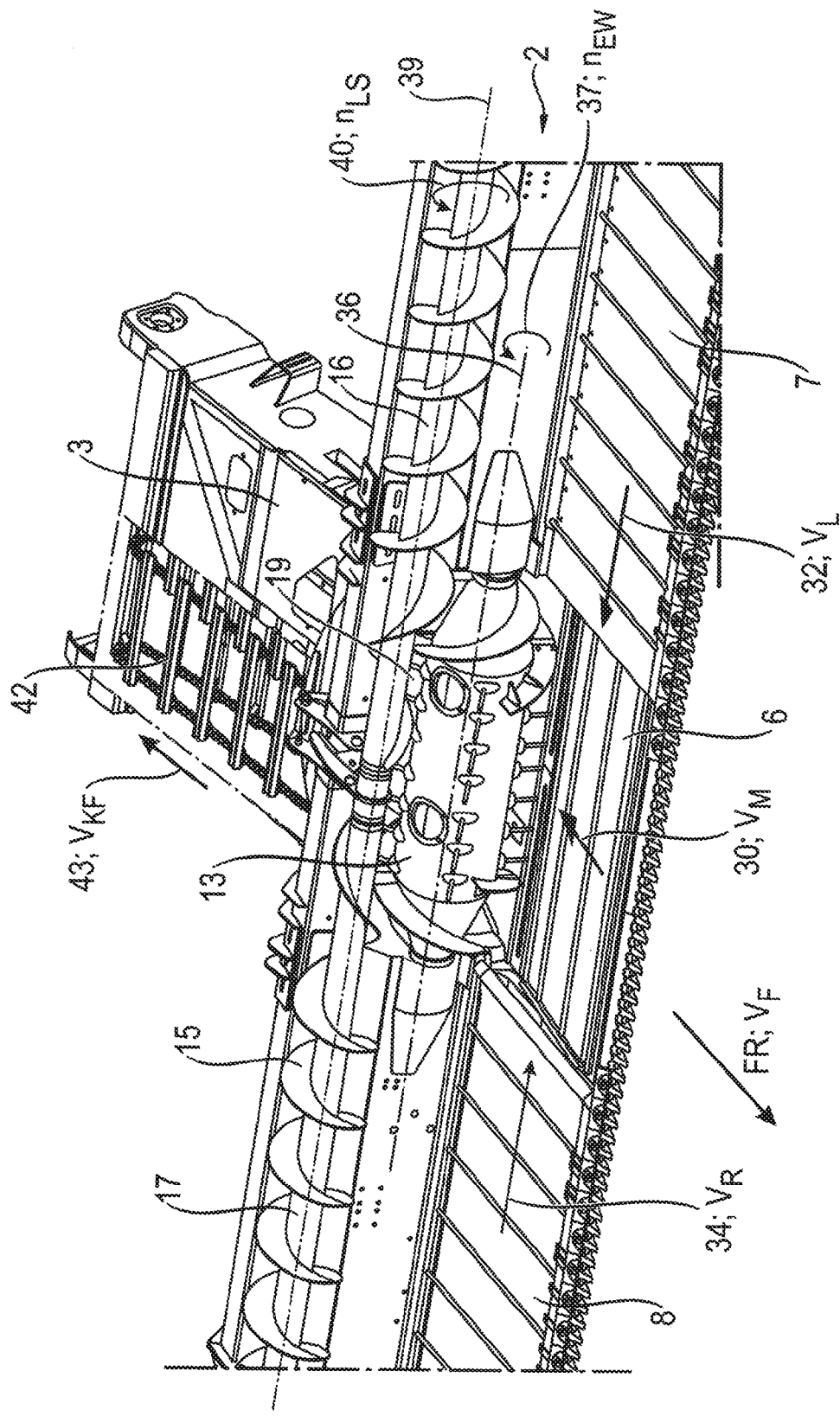
FIGS. 2a-b shows a perspective view of a section of the belt cutting unit having the grain conveyor from FIG. 1, with FIG. 2a illustrating a front view of the belt cutting unit, and FIG. 2b illustrating a back view of the belt cutting unit.
Figure 2B:
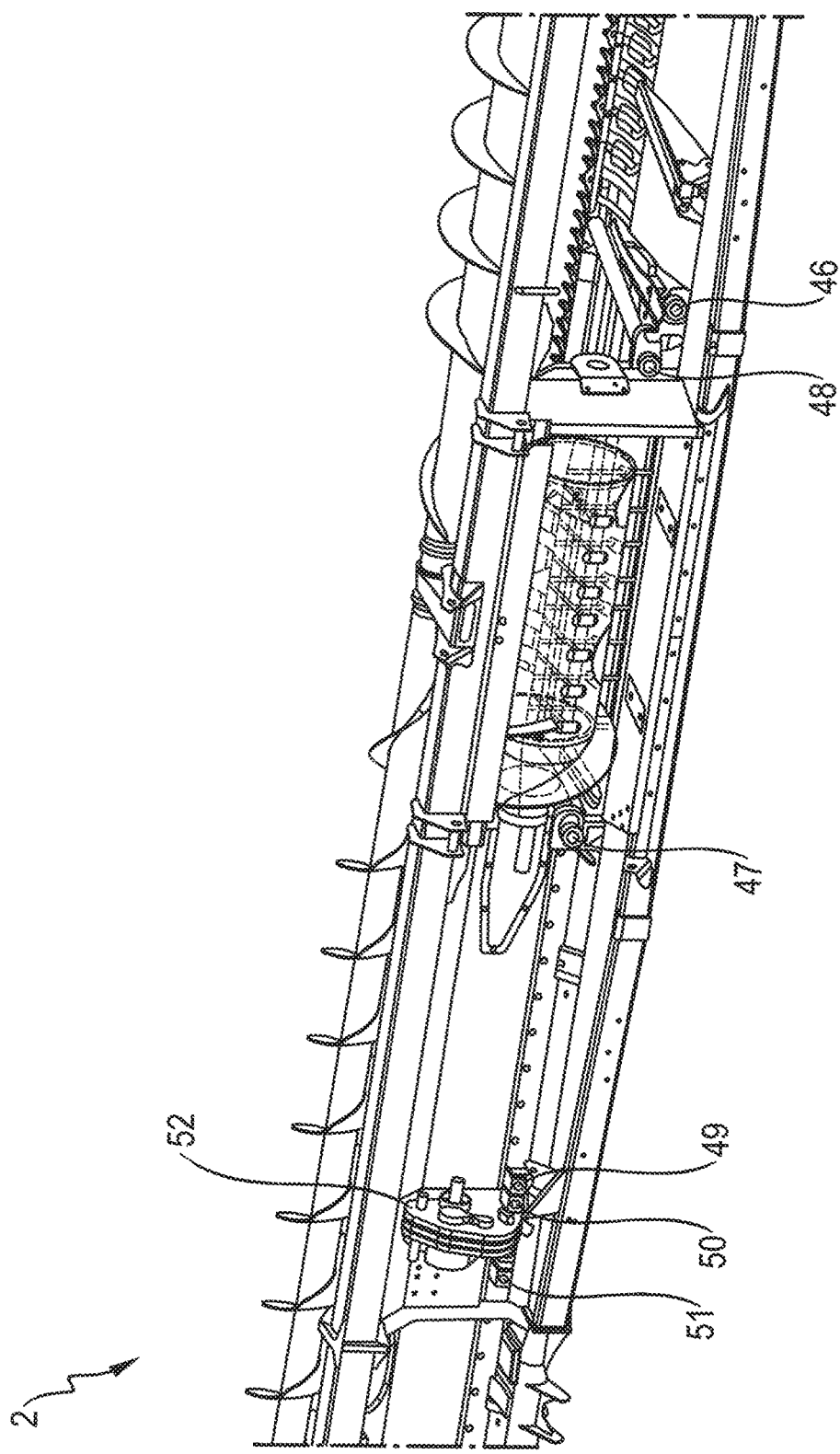

FIGS. 2a-b show a perspective view of a section of the belt cutting unit 2 from FIG. 1, with FIG. 2a illustrating a front view with a partially exposed grain conveyor 3 of the combine harvester 1, and with FIG. 2b illustrating a back view of the belt cutting unit 2, wherein for better illustration, parts of the frame 5 have been omitted. In addition, FIG. 2a shows rotational directions 37, 40 and conveyance directions 30-32, 43 in the conveyance of the harvest to the combine harvester 1 in the standard harvesting mode. The center belt 6 has a first conveyance direction 30 having a first belt speed $v_M$. The conveyance direction 30 of the center belt 6 is parallel and counter to the direction of travel FR in this exemplary embodiment. In one implementation, the conveyance direction 30 of the center belt 6 is toward the intake channel 19. Moreover, the left-hand transverse conveyor belt 7 has a second conveyance direction 32 having a second belt speed $v_L$. The conveyance direction 32 of the left-hand transverse conveyor belt 7 is transverse to the direction of travel FR thereby. The transport direction 32 of the left-hand transverse conveyor belt 7 may be toward the center belt 6. Furthermore, the right-hand transverse conveyor belt 8 has a third conveyance direction 34 having a third belt speed $v_R$. The conveyance direction 34 of the right-hand transverse conveyor belt 8 is likewise transverse to the direction of travel FR thereby. The conveyance direction 34 of the right-hand transverse conveyor belt 8 may likewise be toward the center belt 6. In the implementation explained here, the conveyance directions 32, 34 of both transverse conveyor belts 7, 8 are counter to one another. The intake roller 13 has a rotational axis 36 having a rotation direction 37 and a rotational rate $n_{EW}$ for the intake roller 13. The header auger 15 has another rotational axis 39 having a rotation direction 40 and a rotational rate $n_{LS}$. The grain conveyor 3 has a chain conveyor 42 with a conveyance direction 43 and a conveyance speed $v_{KF}$ for conveying the harvest by the grain conveyor 3.

The center belt 6 and the two transverse conveyor belts 7, 8 are each driven by means of an actuator, in particular by means of a hydraulic motor in each case, such as hydraulic motor 46 of the center belt 6, hydraulic motor 47 of the left-hand transverse conveyor belt 7, hydraulic motor 48 of the right-hand transverse conveyor belt 8 (see FIG. 2b). Alternatively, the actuators can also be designed as electric motors or as mechanical couplings to an internal combustion engine, e.g. by means of gearings or drive belts. A first hydraulic pump 49 on the belt cutting unit 2 is assigned to the hydraulic motor 46 of the center belt 6. A second hydraulic pump 51 is assigned to the hydraulic motor 47 of the left-hand transverse conveyor belt 7. Moreover, a third hydraulic pump 51 is assigned to the hydraulic motor 48 of the right-hand transverse conveyor belt 8. As a result, the center belt 6 and the transverse conveyor belts 7, 8 can be controlled separately in a simple manner. In an alternative design, a single hydraulic pump is assigned collectively to the two hydraulic motors 47, 48 of the transverse conveyor belts 7, 8. This is advantageous in particular in one design, in which both transverse conveyor belts 7, 8 are driven with identical belt speeds $v_L$, $v_R$. The hydraulic pumps 49, 50, 51 are driven by means of a gearing 52 of the belt cutting unit 2. The intake roller 13 may be mechanically driven via the gearing 52, and controlled regarding the rotational rate. The chain conveyor 42 of the grain conveyor 3 may be mechanically driven by means of V-belts and controlled by means of a variator (not shown).

Figure 3A:
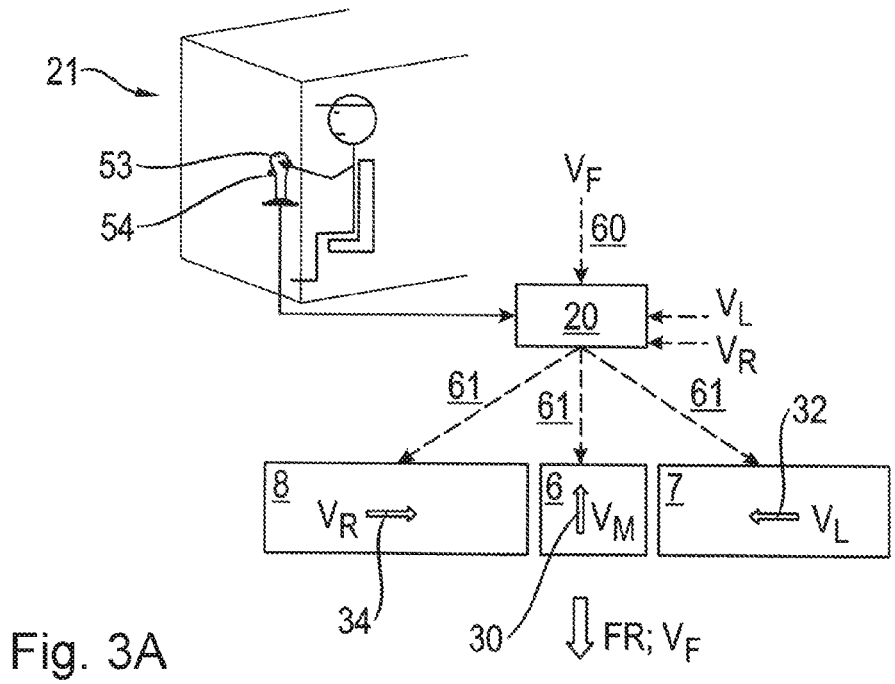
FIGS. 3a-b shows a schematic illustration of a control as a function of the forward travel speed, with FIG. 3a illustrating a control of the center belt and the transverse conveyor belts, and with FIG. 3b illustrating a control of the intake roller and the header auger.
Figure 3B:
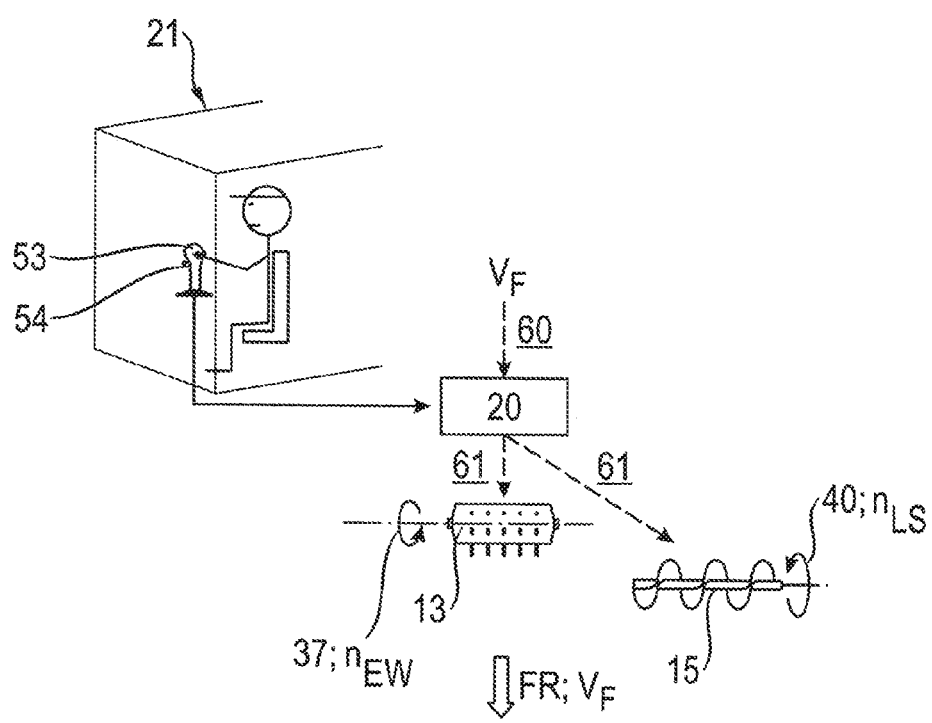

FIG. 3a shows the control of the center belt 6 and the transverse conveyor belts 7, 8 and a multi-function lever 53 in the driver's cab 21. The control unit 20 automatically controls the belt speeds $v_M$, $v_L$, $v_R$ of the center belt 6 and the left-hand and right-hand transverse conveyor belts 7, 8 in a first design as a function of the forward travel speed $v_F$, such that the belt speeds $v_M$, $v_L$, $v_R$ of the center belt 6 and the transverse conveyor belts 7, 8 are adapted to the forward travel speed $v_F$. For this, the forward travel speed $v_F$ is monitored, and individual belt speeds $v_M$, $v_L$, $v_R$ are calculated therefrom for the center belt 6, the left-hand transverse conveyor belt 7, and the right-hand transverse conveyor belt 8. Furthermore, the control unit 20 may automatically control the belt speeds $v_L$, $v_R$ of the left-hand and right-hand transverse conveyor belts 7, 8 in a second, additional or alternative design, as a function of the forward travel speed $v_F$, and may automatically control the belt speed $v_M$ of the center belt 6 as a function of the belt speeds $v_L$, $v_R$ of the left-hand and right-hand transverse conveyor belts 7, 8. The belt speeds $v_L$, $v_R$ of the transverse conveyor belts 7, 8 are adapted thereby to the forward travel speed $v_F$, and the belt speed $v_M$ of the center belt 6 is adapted to the belt speeds $v_L$, $v_R$ of the transverse conveyor belts 7, 8. Thus, in the implementation, for the center belt 6 there is only an indirect dependency on the forward travel speed $v_F$. In an analogous manner to that of the first design, the forward travel speed $v_F$ and the belt speeds $v_L$, $v_R$ are monitored here, and individual belt speeds $v_M$, $v_L$, $v_R$ are calculated therefrom for the center belt 6, the left-hand transverse conveyor belt 7, and the right-hand transverse conveyor belt 8.

Technically, the control according to the invention of the center belt 6 and the transverse conveyor belts 7, 8 is implemented in the first design in that the control unit 20 receives measurement signals 60 comprising data regarding the current forward travel speed $v_F$, e.g. from a vehicle speed sensor. In the second design, the control unit 20 also receives measurement signals 60 comprising data regarding the belt speeds $v_L$, $v_R$ of the left-hand and the right-hand transverse conveyor belts 7, 8, e.g. from rotational rate sensors. In the first design, the control unit 20 calculates the belt speeds $v_L$, $v_R$ of the left-hand and the right-hand transverse conveyor belts 7, 8 and the belt speed $v_M$ of the center belt 6 from the forward travel speed $v_F$. In the second design, the control unit 20 calculates the belt speeds $v_L$, $v_R$ of the left-hand and right-hand transverse conveyor belts 7, 8 from the forward travel speed $v_F$, and belt speed $v_M$ of the center belt 6 from the belt speeds $v_L$, $v_R$ of the left-hand and right-hand transverse conveyor belts 7, 8. The belt speeds $v_M$, $v_L$, $v_R$ can be identical to one another or different in both designs. Subsequently, the control unit 20 transmits control signals 61 to the center belt 6 and the transverse conveyor belts 7, 8. The control signals 61 are received by the hydraulic pumps 49, 50, 51, and change the motor rotational rates of the hydraulic motors 46, 47, 48 for the center belt 6 and the transverse conveyor belts 7, 8 (see FIG. 2b as well). As a result, the belt speeds $v_M$, $v_L$, $v_R$ are set. In that the center belt 6 and the transverse conveyor belts 7, 8 are preferably each assigned their own hydraulic motors 46, 48 and hydraulic pumps 49-51, the center belt 6, the left-hand transverse conveyor belt 7, and the right-hand transverse conveyor belt 8 can each be operated at different belt speeds $v_M$, $v_L$, $v_R$.

The control unit 20 may use weighting parameters and/or algorithms that are stored for the calculations. The weighting parameters are in one implementation linear, such that a proportionate change to the forward travel speed $v_F$ leads to the same proportionate change in the belt speeds $v_M$, $v_L$, $v_R$.

In one implementation, in order to check the set belt speeds $v_M$, $v_L$, $v_R$, or in order to control further components of the belt cutting unit 2, such as the header auger 15, all of the belt speeds $v_M$, $v_L$, $v_R$ are measured in another design, and transmitted to the control unit 20 as measurement signals 60, and processed by the control unit 20. Furthermore, in one implementation, the rotational rates $n_{LS}$, $n_{EW}$ of the header auger 15, the intake roller 13 and/or the conveyance speed $v_{KF}$ of the chain conveyor 42 of the grain conveyor 3 are transmitted as measurement signals 60 to the control unit 20, and processed by the control unit 20.

In one design, the belt speeds $v_L$, $v_R$ of the left-hand and the right-hand transverse conveyor belts 7, 8 and/or the belt speed $v_M$ of the center belt 6 are coupled to the forward travel speed $v_F$ such that when the forward travel speed $v_F$ is increased, the belt speeds $v_M$, $v_L$, $v_R$ of the left-hand and right-hand transverse conveyor belts as well as the center belt 6 are increased. By lowering the forward travel speed $v_F$, the belt speeds $v_M$, $v_L$, $v_R$ of the left-hand and the right-hand transverse conveyor belts 7, 8 as well as the center belt 6 are reduced. Alternatively, only the belt speeds of the left-hand and the right-hand transverse conveyor belts 7, 8 are coupled to the forward travel speed $v_F$ in this manner. When the belt speeds $v_L$, $v_R$ of the transverse conveyor belts 7, 8 are coupled to the forward travel speed $v_F$, they may be a predetermined amount different, such as up to two km/h higher or lower, than the forward travel speed $v_F$. Furthermore, the belt speed $v_M$ of the center belt 6 may also the same predetermined amount different, for example up to two km/h higher, than the forward travel speed $v_F$ when coupled to the forward travel speed $v_F$.

In another implementation, the belt speed $v_M$ of the center belt 6 is coupled to the belt speeds $v_L$, $v_R$ of at least the left-hand and/or right-hand transverse conveyor belts 7, 8. In a specific implementation, the belt speed $v_M$ of the center belt 6 is set to a constant relationship to at least one of the belt speeds $v_L$, $v_R$ (and potentially both) of the two transverse conveyor belts. The control unit 20 may calculate the belt speed $v_M$ of the center belt 6 from the belt speeds $v_L$, $v_R$ of the two transverse conveyor belts 7, 8 as well, when the two belt speeds $v_L$, $v_R$ are identical. If the belt speeds $v_L$, $v_R$ of the transverse conveyor belts 7, 8 are increased, then the belt speed $v_M$ of the center belt 6 may also be increased, in particular by the same factor. If the belt speeds $v_L$, $v_R$ of the transverse conveyor belts 7, 8 are reduced, then the belt speed $v_M$ of the center belt 6 may also be reduced, such as, in particular, by the same factor. Further, the control unit 20 may calculate the belt speed $v_M$ of the center belt 6 from the belt speed $v_L$, $v_R$ of the left-hand or right-hand transverse conveyor belt 7, 8 when the belt speeds $v_L$, $v_R$ of the left-hand and the right-hand transverse conveyor belts 7, 8 are different. The belt speeds $v_L$, $v_R$ of the left-hand and the right-hand transverse conveyor belts 7, 8 may differ in particular on slopes, and when there is a slope-dependent control of the belt speeds $v_L$, $v_R$ of the transverse conveyor belts 7, 8. The belt speed $v_M$ of the center belt 6 may be coupled to the belt speed $v_L$, $v_R$ of a transverse conveyor belt 7, 8 that conveys downhill. If the belt speed $v_L$, $v_R$ of the transverse conveyor belt 7, 8 conveying downhill is increased, then the belt speed $v_M$ of the center belt 6 may also be increased, such as, in particular, by the same factor. If the belt speeds $v_L$, $v_R$ of the transverse conveyor belts 7, 8 are reduced, then the belt speed $v_M$ of the center belt 6 may also be reduced, such as, in particular, by the same factor. Fundamentally, the principle can also be applied to the other transverse conveyor belt 8, 7.

In another design, the belt speed $v_M$ of the center belt 6, the belt speed $v_L$ of the left-hand transverse conveyor belt 7 and/or the belt speed $v_R$ of the right-hand transverse conveyor belt 8 are coupled to the forward travel speed $v_F$ in a manner specific to the type of harvest. For this, preferably harvest type specific weighting parameters, such as weighting parameters for wheat or weighting parameters for rapeseed, are used by the control unit 20 in the calculation of the belt speeds $v_M$, $v_L$, $v_R$. The type of harvest is may be selected in advance by the vehicle operator. The belt speeds $v_M$, $v_L$, $v_R$ may be preferably adjusted to the harvest at an identical relationship to one another. In particular, the control unit 20 may set higher belt speeds $v_M$, $v_L$, $v_R$ for grains, and lower belt speeds $v_M$, $v_L$, $v_R$ for rapeseed.

A minimum belt speed $v_M$, $v_L$, $v_R$ and a maximum belt speed $v_M$, $v_L$, $v_R$ may preferably be set for the center belt 6 and the transverse conveyor belts 7, 8 in the exemplary implementation shown here. The values for the minimum belt speed $v_M$, $v_L$, $v_R$ and the maximum belt speed $v_M$, $v_L$, $v_R$ may be independent of the forward travel speed $v_F$. They delimit an adjustable range for the belt speeds $v_M$, $v_L$, $v_R$ of the center belt 6 and the transverse conveyor belts 7, 8. In one implementation, the control unit 20 does not set speeds below the minimum belt speed $v_M$, $v_L$, $v_R$, or above the maximum belt speed $v_M$, $v_L$, $v_R$. These maximum and minimum belt speeds can preferably be set by the vehicle operator. Alternatively, the maximum and minimum belt speeds may be pre-set at the factory upon manufacture. The minimum and/or maximum belt speeds $v_M$, $v_L$, $v_R$ may be specific to the type of harvest.

The center belt 6 may also has a higher belt speed $v_M$ than one or both of the transverse conveyor belts 7, 8. In particular, the belt speed $v_M$ of the center belt 6 may be set such that there will be no back-up of harvest on the center belt 6.

For this, the two volume flows of harvest entering the center belt 6 from the two transverse conveyor belts 7, 8 corresponds collectively to a harvest flow exiting the center belt 6. The level of deviation may be dependent thereby on the belt speeds $v_L$, $v_R$ of the transverse conveyor belts 7, 8.

In one design, a slope is measured by means of slope sensors, known to those skilled in the art and not described herein in detail, preferably on the belt cutting unit 2 or alternatively on the combine harvester 1. With a slope of 0°, or substantially 0°, i.e. when the belt cutting unit 2 is located in flat terrain, the belt speeds $v_L$, $v_R$ of the left-hand and right-hand transverse conveyor belts 7, 8 are identical. With a slope not equal to 0°, or substantially not equal to 0°, one of the two transverse conveyor belts 7, 8 is an uphill conveying transverse conveyor belt 7, 8, and the other transverse conveyor belt 8, 7 is a downhill conveying transverse conveyor belt 8, 7. The control unit 20 may reduce the belt speed $v_R$, $v_L$ of the downhill conveying transverse conveyor belt 8, 7, and may increase the belt speed $v_L$, $v_R$ of the uphill conveying transverse conveyor belt 7, 8 as a function of the tilt of the belt cutting unit 2. In one implementation, the two belt speeds $v_L$, $v_R$ may be changed thereby by the same amount. Alternatively, only one of the belt speeds $v_L$, $v_R$ is changed. In another implementation, the belt speed $v_M$ of the center belt 6 is also increased as a function of the slope, such as a predetermined amount (e.g., up to 20%) of the belt speed $v_M$ of the center belt 6 that has been set.

In another design, the belt speed $v_M$ of the center belt and the belt speeds $v_L$, $v_R$ of the transverse conveyor belts 7, 8 are reduced to the minimum belt speed $v_M$, $v_L$, $v_R$ when driving out of a crop, in particular in a headland. The driving out of the crop may be detected by the control unit 20. For this, necessary data can preferably be automatically transmitted to the control unit 20 from a route management system, a GPS based field map, and/or from environment sensors, and used by the control unit 20 as a signal indicating the exiting of the crop. The reducing of the belt speeds $v_M$ of the center belt 6 and the belt speeds $v_L$, $v_R$ of the transverse conveyor belts 7, 8 to the minimum belt speed $v_M$, $v_L$, $v_R$ is integrated in a field end management system. Alternatively or additionally, the driving out of the crop can be indicated by the vehicle operator.

In another design, the belt speeds $v_M$, $v_L$, $v_R$ may be manually adjusted in the range between the minimum and maximum belt speeds $v_M$, $v_L$, $v_R$, e.g. by the vehicle operator. The belt speeds $v_M$, $v_L$, $v_R$ may be selected thereby from a scale of 0% to 100%, wherein the percentage value is preferably linked to the belt speeds $v_M$, $v_L$, $v_R$ in a linear manner. 0% is preferably the minimum belt speed $v_M$, $v_L$, $v_R$ thereby, and 100% is preferably the maximum belt speed $v_M$, $v_L$, $v_R$. The driver's cab 21 of the combine harvester 1 may have a switch element (not shown) in order to switch from an automatic belt speed mode by means of the control unit 20, to a manual belt speed mode.

Moreover, the conveyance directions 30, 32, 34 of the center belt 6 and the transverse conveyor belts 7, 8 can be reversed, such as by means of a switch element in the driver's cab 21. The switch element may be disposed on a multi-function lever 53. For this, the control unit 20 also controls the conveyance directions 30, 32, 34 of the center belt 6 and the transverse conveyor belts 7, 8. The control unit 20 may receive measurement signals 60 comprising data regarding the direction of rotation of the motors of the hydraulic motors 46, 47, 48. The hydraulic motors 46, 47, 48 may be driven in two rotational directions of the motor. The hydraulic pumps 49, 50, 51 may be driven in a pump conveyance direction. Furthermore, valves may be assigned to the hydraulic motors. When the conveyance directions 30, 32, 34 are reversed in the exemplary implementations disclosed herein, the hydraulic pumps 49, 50, 51 drive the hydraulic motors 46, 47, 48 of the center belt 6 and the transverse conveyor belts 7, 8 in a reversed rotational direction of the motor, such as, for example, by changing a valve setting of the valves.

The grain conveyor 3 may have a chain conveyor 42, and the rotational direction 37 of the intake roller 13 and/or the conveyance direction 43 of the chain conveyor 42 of the grain conveyor 3, and the conveyance direction 30 of the center belt 6, may be collectively reversed. The transverse conveyor belts 7, 8 may be stopped thereby. In this manner, harvest is conveyed in the reversed direction, back out of the intake channel 19 of the grain conveyor 3, and away from the intake channel 19. For this, the control unit 20 also controls the rotational directions 37, 39 of the intake roller 13 and the header auger 15. Moreover, the control unit 20 may control the conveyance direction 43 of the chain conveyor 42 of the grain conveyor 3. For this, the control unit 20 transmits control signals 61 to the intake roller 13, the chain conveyor 42, the center belt and the transverse conveyor belts, in particular to the actuators thereof, e.g. the hydraulic pumps 49, 50, 51. This reversal of the rotational direction 37 and the conveyance directions 43, 30, and the stopping of the transverse conveyor belts 7, 8 may take place by means of a switch element in the driver's cab 21. The switch element may be disposed on the multi-function lever 53.

The combine harvester may have a multi-function lever 53 in the driver's cab 21, having at least one switch 54 for controlling the center belt 6 and the transverse conveyor belts 7, 8. The switch 54 may have multiple settings, such as three settings. In a first setting, the center belt 6 and the transverse conveyor belts 7, 8 are reversed. This means that their conveyance directions 30, 32, 34 are reversed. In a second setting, the belt speeds $v_M$, $v_L$, $v_R$ of the center belt 6 and the transverse conveyor belts 7, 8 are reduced to preferably a predetermined amount, such as 25% of the set belt speeds $v_M$, $v_L$, $v_R$. The third setting is a neutral setting, without any function being assigned thereto. Alternatively, the switch 54 may also be designed as an element in an electronic terminal.

In an additional or alternative implementation, the belt cutting unit 2 has an intake roller behind the center belt 6, for drawing the harvest into the intake channel 19 and/or at least one header auger 15 for conveying harvest to the intake roller 13 and/or to the center belt 6 (see FIGS. 1 and 2a as well), as well as the control unit 20, which is configured to control the rotational rate $n_{EW}$ of the intake roller 13 and/or the rotational rate $n_{LS}$ of the header auger 15 as a function of the forward travel speed $v_F$, such that the rotational rates $n_{EW}$, $n_{LS}$ of the intake roller 13 and/or the header auger 15 are adjusted to the forward travel speed $v_F$. Preferably, both rotational rates $n_{EW}$, $n_{LS}$ are adjusted to the forward travel speed $v_F$. For this, the forward travel speed $v_F$ is monitored, and the control unit 20 calculates the rotational rates $n_{EW}$, $n_{LS}$ of the intake roller 13 and the header auger 15 from this, and transmits the control signals 61 to the intake roller 13 and the header auger 15, in particular to the actuators thereof. An increase in the forward travel speed $v_F$ leads thereby to an increase in the rotational rates $n_{EW}$, $n_{LS}$ of the intake roller 13 and the header auger 15. A reduction in the forward travel speed $v_F$ leads thereby to a reduction of the rotational rates $n_{EW}$, $n_{LS}$ of the intake roller 13 and the header auger 15. The detailed technical control can be derived by the person skilled in the art from the preceding description in an analogous manner.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

REFERENCE SYMBOL LIST 1 combine harvester
2 belt cutting unit
3 grain conveyor
4 longitudinal axis of the belt cutting unit
5 frame of the belt cutting unit
6 center belt
7 left-hand transverse conveyor belt
8 right-hand transverse conveyor belt
9 width of the belt cutting unit
10 continuous belt
11 cutter bar
12 reel
13 intake roller
14 finger element of the intake roller
15 header auger
16 first roller of the header auger
17 second roller of the header auger
18 auger flight of the header auger
19 intake channel of the grain conveyor
20 control unit
21 driver's cab
30 first conveyance direction of the center belt
32 second conveyance direction of the left-hand transverse conveyor belt
34 third conveyance direction of the right-hand transverse conveyor belt
36 rotational axis of the intake roller
37 rotational direction of the intake roller
39 rotational axis of the header auger
40 rotational direction of the header auger
42 chain conveyor of the grain conveyor
43 conveyance direction of the chain conveyor of the grain conveyor
46 hydraulic motor of the center belt
47 hydraulic motor of the left-hand transverse conveyor belt
48 hydraulic motor of the right-hand transverse conveyor belt
49 first hydraulic pump of the center belt
50 second hydraulic pump of the left-hand transverse conveyor belt
51 third hydraulic pump of the right-hand transverse conveyor belt
52 gearing for the belt cutting unit
53 multi-function lever
54 switch
60 measurement signal
61 control signal
FR direction of travel
$v_F$ forward travel speed of the combine harvester
$v_M$ first belt speed of the center belt $v_L$ second belt speed of the left-hand transverse conveyor belt
$v_R$ third belt speed of the right-hand transverse conveyor belt
$n_{EW}$ rotational rate of the intake roller
$n_{LS}$ rotational rate of the header auger
$v_{KF}$ conveyance speed of the chain conveyor of the grain conveyor

The invention claimed is:

1. A combine harvester comprising:
   at least one speed sensor configured to generate speed data indicative of forward travel speed of the combine harvester;
   a belt cutting unit that comprises:
      at least one center belt configured to convey harvest to at least one of an intake roller or an intake channel of a grain conveyor;
      at least one left-hand transverse conveyor belt disposed on a left-hand side of the center belt; and
      at least one right-hand transverse conveyor belt disposed on a right-hand side of the center belt, wherein the left-hand transverse conveyor belt and the right-hand transverse conveyor belt are configured to convey the harvest to the center belt, wherein the center belt, the left-hand transverse conveyor belt and the right-hand transverse conveyor belt are disposed behind a cutter bar, seen in a direction of travel, wherein the center belt, the left-hand transverse conveyor belt and the right-hand transverse conveyor belt are each operated at a respective belt speed,
   a control unit configured to:
      receive the speed data indicative of the forward travel speed of the combine harvester;
      automatically control, based on the speed data indicative of the forward travel speed of the combine harvester, the belt speed of the center belt, the belt speed of the left-hand transverse conveyor belt, and the belt speed of the right-hand transverse conveyor belt as a function of the forward travel speed of the combine harvester.

2. The combine harvester according to claim 1, wherein the control system is configured to control the belt speeds of the left-hand transverse conveyor belt and the right-hand transverse conveyor belt or the belt speed of the center belt as a function of the forward travel speed.

3. The combine harvester according to claim 1, wherein the control system is configured to control the belt speed of the center belt based on both the belt speeds of the left-hand transverse conveyor belt and the right-hand transverse conveyor belt.

4. The combine harvester according to claim 1, wherein the control system is further configured to control the belt speed of the center belt based on at least one of the belt speeds of the left-hand transverse conveyor belt or the right-hand transverse conveyor belt.

5. The combine harvester according to claim 1, wherein an operator of the combine harvester selects a type of harvest; and
   wherein the control system is configured to control the belt speed of the center belt, the belt speed of the left-hand transverse conveyor belt, and the belt speed of the right-hand transverse conveyor belt as a function of the forward travel speed of the combine harvester and the type of harvest.

6. The combine harvester according to claim 5, wherein a first type of harvest comprises grains;
   wherein a second type of harvest comprises rapeseed;
   wherein responsive to the control unit determining that the type of harvest comprises grains, the control unit sets higher belt speeds for the center belt, the left-hand transverse conveyor belt, and the right-hand transverse conveyor belt; and
   wherein responsive to the control unit determining that the type of harvest comprises rapeseed, the control unit sets lower belt speeds for the center belt, the left-hand transverse conveyor belt, and the right-hand transverse conveyor belt.

7. The combine harvester according to claim 1, wherein an operator of the combine harvester selects a type of harvest; and
   wherein the control system is configured to control the belt speed of at least one of the center belt, the left-hand transverse conveyor belt, or the right-hand transverse conveyor belt as a function of the forward travel speed of the combine harvester and the type of harvest.

8. The combine harvester according to claim 1, wherein an operator of the combine harvester sets a minimum belt speed and a maximum belt speed for each of the center belt, the left-hand transverse conveyor belt, and the right-hand transverse conveyor belt.

9. The combine harvester according to claim 1, wherein, with a slope, the control unit controls, via control signals sent to respective hydraulic pumps, the belt speeds of the left-hand transverse conveyor belt and the right-hand transverse conveyor belt as a function of tilt of the belt cutting unit and conveyance directions of the left-hand transverse conveyor belt and the right-hand transverse conveyor belt.

10. The combine harvester according to claim 9, wherein, in response to determining that the slope is uphill, the control unit controls, via the control signals to the respective hydraulic pumps controlling the left-hand transverse conveyor belt and the right-hand transverse conveyor belt, to increase the belt speeds of the left-hand transverse conveyor belt and the right-hand transverse conveyor belt; and
   wherein, in response to determining that the slope is downhill, the control unit controls, via the control signals to the respective hydraulic pumps controlling the left-hand transverse conveyor belt and the right-hand transverse conveyor belt, to decrease the belt speeds of the of the left-hand transverse conveyor belt and the right-hand transverse conveyor belt.

11. The combine harvester according to claim 1, wherein the control unit controls the belt speed of the center belt as a function of tilt of the belt cutting unit.

12. The combine harvester according to claim 1, further comprising at least one of a route management system, a GPS based field map, or environment sensors; and
   wherein the control unit, based on data generated by the at least one of the route management system, the GPS based field map, or the environment sensors, reduces the belt speeds of the center belt, the left-hand transverse conveyor belt, and the right-hand transverse conveyor belt to a minimum belt speed responsive to determining that the combine harvester is driving out of a crop.

13. The combine harvester according to claim 1, further comprising a switch element configured to switch from an automatic belt speed mode in which the control unit automatically controls the center belt, the left-hand transverse conveyor belt, and the right-hand transverse conveyor belt, to a manual belt speed mode in which an operator manually adjusts the belt speed of the center belt, the belt speed of the left-hand transverse conveyor belt, and the belt speed of the right-hand transverse conveyor belt; and wherein the control unit receives the manual adjustments of the belt speeds of the center belt, the left-hand transverse conveyor belt, and the right-hand transverse conveyor belt in a range between a minimum belt speed and a maximum belt speed in order to control the combine harvester in the manual belt speed mode.

14. The combine harvester according to claim 1, further comprising hydraulic pumps and hydraulic motors, the hydraulic pumps driving the hydraulic motors in order to move the center belt, the left-hand transverse conveyor belt, and the right-hand transverse conveyor belt; and wherein the control unit is configured to control, via control signals to the hydraulic pumps, the center belt, the left-hand transverse conveyor belt and the right-hand transverse conveyor belt in order to reverse conveyance directions of the center belt, the left-hand transverse conveyor belt and the right-hand transverse conveyor belt.

15. The combine harvester according to claim 1, wherein the grain conveyor includes a chain conveyor; and wherein the control unit is configured to:
control the intake roller, the chain conveyor of the grain conveyor, and the center belt in order to collectively reverse a rotational direction of the intake roller, a conveyance direction of the chain conveyor of the grain conveyor and a conveyance direction of the center belt; and
stop the left-hand transverse conveyor belt and the right-hand transverse conveyor belt.

16. The combine harvester according to claim 1, wherein the grain conveyor includes a chain conveyor; and wherein the control unit is configured to:
control at least one of the intake roller or the chain conveyor of the grain conveyor and the center belt in order to reverse at least one of a rotational direction of the intake roller or to reverse conveyance directions of the chain conveyor of the grain conveyor and the center belt; and
stop the left-hand transverse conveyor belt and the right-hand transverse conveyor belt.

17. The combine harvester according to claim 1, further comprising a driver's cab including a multi-function lever with a switch;

wherein the switch comprises a first switch setting and a second switch setting; and wherein the control unit is configured to:
responsive to receiving the first switch setting from the switch, control the center belt, the left-hand transverse conveyor belt and the right-hand transverse conveyor belt in order to reverse the center belt, the left-hand transverse conveyor belt and the right-hand transverse conveyor belt; and
responsive to receiving the second switch setting from the switch, control the center belt, the left-hand transverse conveyor belt and the right-hand transverse conveyor belt in order to reduce the belt speeds of the center belt, the left-hand transverse conveyor belt and the right-hand transverse conveyor belt to a predetermined value.

18. The combine harvester according to claim 1, wherein the belt cutting unit includes an intake roller positioned behind the center belt for drawing the harvest into an intake channel, and at least one header auger to convey the harvest to at least one of the intake roller or the center belt; and wherein the control unit controls a rotational rate of the intake roller and a rotational rate of the header auger as a function of forward travel speed of the combine harvester.

19. The combine harvester according to claim 1, wherein the belt cutting unit includes the control unit.

20. A combine harvester comprising:
a belt cutting unit that comprises:
at least one center belt configured to convey harvest to at least one of an intake roller or an intake channel of a grain conveyor;
at least one left-hand transverse conveyor belt disposed on a left-hand side of the center belt; and
at least one right-hand transverse conveyor belt disposed on a right-hand side of the center belt, wherein the left-hand transverse conveyor belt and the right-hand transverse conveyor belt are configured to convey the harvest to the center belt, wherein the center belt, the left-hand transverse conveyor belt and the right-hand transverse conveyor belt are disposed behind a cutter bar, seen in a direction of travel, wherein the center belt, the left-hand transverse conveyor belt and the right-hand transverse conveyor belt are each operated at a respective belt speed,
hydraulic pumps and hydraulic motors, the hydraulic pumps driving the hydraulic motors in order to move the center belt, the left-hand transverse conveyor belt, and the right-hand transverse conveyor belt;
sensors configured to generate measurement signals indicative of respective rotational speeds of the right-hand transverse conveyor belt and the left-hand transverse conveyor belt;
a control unit configured to:
receive the respective rotational speeds of the right-hand transverse conveyor belt and the left-hand transverse conveyor belt, the respective rotational speed of the right-hand transverse conveyor belt indicative of the belt speed of the right-hand transverse conveyor belt, the respective rotational speed of the left-hand transverse conveyor belt indicative of the belt speed of the left-hand transverse conveyor belt;
determine, based on the respective rotational speeds of the right-hand transverse conveyor belt and the left-hand transverse conveyor belt, the belt speed of the center belt as a function of at least one of the belt speed of the left-hand transverse conveyor belt or the belt speed of the right-hand transverse conveyor belt; and
automatically control, via a control signal to the hydraulic pump for the hydraulic motor moving the center belt, the belt speed of the center belt to the determined belt speed.

21. The combine harvester according to claim 20, wherein the control unit automatically controls the belt speed of the center belt as a function of both the belt speed of the left-hand transverse conveyor belt or the belt speed of the right-hand transverse conveyor belt in order for the belt speed of the center belt to be in a constant relationship to both the belt speed of the left-hand transverse conveyor belt and the belt speed of the right-hand transverse conveyor belt.

22. The combine harvester according to claim 20, wherein the control unit determines, based on the belt speed of the left-hand transverse conveyor belt and the belt speed of the right-hand transverse conveyor belt, that the belt speed of the left-hand transverse conveyor belt and the belt speed of the right-hand transverse conveyor belt have increased by a factor; and responsive to determining that the belt speed of the left-hand transverse conveyor belt and the belt speed of the right-hand transverse conveyor belt have increased, the control unit controls the belt speed of the center belt to increase by the same factor.

23. The combine harvester according to claim 22, wherein the belt speed of the left-hand transverse conveyor belt and the belt speed of the right-hand transverse conveyor belt are different from one another;

wherein the control unit controls the belt speed of the center belt based on the belt speed of only one of the left-hand transverse conveyor belt or the right-hand transverse conveyor belt;

further comprising a slope sensor generating slope data;

where the control unit controls the belt speed of the left-hand transverse conveyor belt and the belt speed of the right-hand transverse conveyor belt based on the slope data; and wherein the control unit selects the belt speed for the center belt to be coupled to one of the belt speed of the left-hand transverse conveyor belt and the belt speed of the right-hand transverse conveyor belt.

* * * * *